(12) United States Patent
Krafft et al.

(10) Patent No.: US 8,739,952 B2
(45) Date of Patent: *Jun. 3, 2014

(54) FLIP-FLOP CLUTCH

(75) Inventors: Rainer Krafft, Heiligenberg (DE); Sigmund Geiger, Markdorf (DE)

(73) Assignee: Licos Trucktec GmbH, Markdorf (DE)

( * ) Notice: Subject to any disclaimer, the term of this patent is extended or adjusted under 35 U.S.C. 154(b) by 214 days.

This patent is subject to a terminal disclaimer.

(21) Appl. No.: 12/759,978

(22) Filed: Apr. 14, 2010

(65) Prior Publication Data

US 2010/0263981 A1    Oct. 21, 2010

(30) Foreign Application Priority Data

Apr. 17, 2009    (DE) .......................... 10 2009 017 566

(51) Int. Cl.
*F16D 27/01*    (2006.01)
*F16D 27/112*    (2006.01)

(52) U.S. Cl.
USPC ................................. 192/84.31; 192/84.961

(58) Field of Classification Search
USPC ....................................................... 192/84.31
See application file for complete search history.

(56) References Cited

U.S. PATENT DOCUMENTS

| | | | | |
|---|---|---|---|---|
| 3,263,784 A | * | 8/1966 | Pierce ......................... | 192/84.31 |
| 3,741,353 A | * | 6/1973 | McKinley et al. ............ | 188/171 |
| 5,121,018 A | * | 6/1992 | Oldakowski ................... | 310/77 |
| 5,185,542 A | * | 2/1993 | Lazorchak ..................... | 310/36 |
| 5,739,605 A | * | 4/1998 | Lazorchak ..................... | 310/78 |
| 5,847,478 A | * | 12/1998 | Usui et al. ..................... | 310/76 |
| 8,336,696 B2 | * | 12/2012 | Geiger ......................... | 192/84.31 |
| 2007/0246322 A1 | * | 10/2007 | Schachtl et al. ............ | 192/84.31 |
| 2009/0314600 A1 | * | 12/2009 | Kato et al. .................. | 192/84.31 |
| 2009/0321213 A1 | * | 12/2009 | Geiger ........................ | 192/84.31 |

FOREIGN PATENT DOCUMENTS

DE    10 2004 039 264 A1    2/2006
EP    0 793 034 A2    9/1997

OTHER PUBLICATIONS

European Search Report, European Application No. 10003236.6, dated Jun. 20, 2013 (6 pages).

* cited by examiner

*Primary Examiner* — Richard M. Lorence

(74) *Attorney, Agent, or Firm* — Burr & Brown, PLLC

(57) ABSTRACT

An electromagnetic friction disk clutch for use in vehicles is described, which permits a significant saving in energy over known clutches. For this purpose, the clutch according to the invention is embodied in such a way that an electromagnet is loaded with a raised strength of current only to change over between the clutch states of the engaged state and the disengaged state. While the clutch remains in these states up to the next shifting process, the supply of current to the solenoid can be greatly reduced or even switched off.

7 Claims, 1 Drawing Sheet

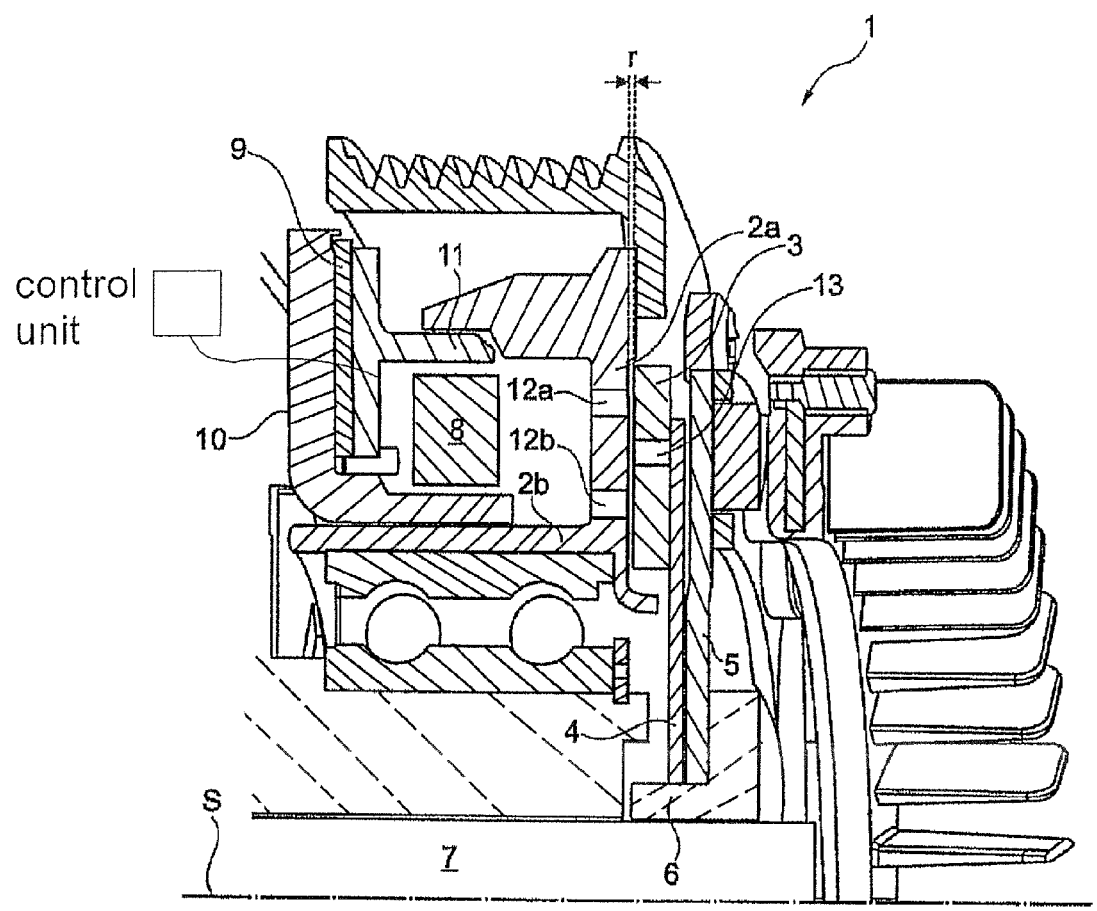

FLIP-FLOP CLUTCH

This application claims the benefit under 35 USC §119(a)-(d) of German Application No. 10 2009 017 566.0 filed Apr. 17, 2009, the entirety of which is incorporated herein by reference.

FIELD OF THE INVENTION

The invention relates to an electromagnetically operated friction disk clutch for a motor vehicle having a rotor, an armature disk which can be attracted against the rotor by means of magnetic forces, and a switchable coil for applying a force to the armature disk.

BACKGROUND OF THE INVENTION

Electromagnetically operated clutches in which permanent magnets are used are known. The permanent magnets are used, for example, for increasing the attraction force on friction faces or to bring about a non-rotationally-fixed transmission of a rotational movement through eddy current induction. Furthermore, permanent magnets in such clutches are also used to fix a certain shifted state of the clutch, for example the engaged clutch, even when the power supply fails, while a second state is brought about by energizing the solenoid, the force of which cancels out the effect of the permanent magnets. It is therefore necessary to maintain at least one of the clutch states predominantly or completely by means of the force applied by the solenoid. For this reason, electromagnetic clutches are considerable consumers of electrical power, for example in vehicles.

SUMMARY OF THE INVENTION

The invention is based on the object of making available a clutch of the type which is described in the introduction and which can be operated, in particular, in an energy-saving fashion in vehicles.

The invention is based on an electromagnetically operated friction disk clutch for a motor vehicle having a rotor, in particular for initiating a drive torque, an armature disk which can be attracted against the rotor by means of magnetic forces, and a controllable coil for applying a force to the armature disk. The core of the invention is that permanent magnets are provided which bring about an attraction force of the armature disk against a component which interacts magnetically with the armature disk, with the result that the armature disk rests against the component, wherein the clutch elements are matched to one another in such a way that the armature disk remains in a position in which it is separated from the component when a shifting force has been applied to the armature disk by the electric coil counter to the force of the permanent magnets, which shifting force brings about the separation of the armature disk from the component, and subsequently a magnetic shifting force of the electric coil disappears.

The object of the permanent magnets is to apply a force to the armature disk, with the result that it is held in a position which corresponds to a predetermined shifted state of the clutch. For example, the armature disk can be located here in a position in which it is attracted to the pole faces of a rotor. If the clutch transmits rotational movements owing to this position of the armature disk, this corresponds to the engaged state of the clutch. In the attracted position of the armature disk, the holding force of the permanent magnets is stronger than an opposing force, which acts on the armature disk from clutch elements which are intended for that purpose. For this reason, in the attracted position the electromagnet does not have to generate any force which is absolutely necessary to obtain this position. The solenoid can, however, be supplied with the current which, under certain circumstances, it may require for further tasks. (Increasing the adhesion or compensating for decreasing remanence of the permanent magnets). The armature disk can leave the attracted position only if the magnetic flux in the region of the pole faces of the interacting component is reduced to such an extent that the armature disk is released from the attracted position and removed. In order to generate a magnetic flux which reduces that of the permanent magnets, the solenoid is connected to an increased strength of current. The flow of current in the electromagnet is given such a polarity that the magnetic field which is generated thereby is directed counter to the field of the permanent magnets. The strength of current is dimensioned here such that the magnetic attraction force on the armature disk is smaller than an opposing force which acts in this position and is applied by clutch elements acting counter to the permanent magnets.

Because the magnetic attraction force which is generated by the permanent magnets at the pole faces of the interacting component decreases to a very great extent as the distance increases, the armature disk moves, for example, in an accelerated fashion into a new position with the aid of the opposing force. This opposing force is applied by clutch elements such as, for example, metal springs or elastically deformable connecting elements which act on the armature disk and permit, in particular, only a movement of the armature disk in the axial direction of the rotational axis of the clutch.

The clutch elements which apply the opposing force are matched, in particular, to the permanent magnets in such a way that they act on, cancel out or exceed the attraction force of the permanent magnets which act on the clutch disk in the stable, separated position. The inventive matching of the clutch elements to the permanent magnets has the effect that the separated position of the armature disk is maintained even if the absolute value of the force of the electromagnet is greatly reduced compared to the shifting force or even completely disappears.

The separated position is preferably either near to the position of rest of a relaxed, elastically deflectable clutch element or against a mechanical stop which is located at a sufficient distance from the component which interacts magnetically and bounds the movement of the clutch disk in the direction of the opposing force. In the attracted position, the pole faces against which the magnetic flux generated by the permanent magnets is directed form the movement boundary for the armature disk.

Under influences which are close to those during deployment, for example vibrations and shocks of predefined intensity, the states of the clutch are stable if jolts out of one of the defined positions which are sufficiently small compared to the overall length of the actuating path do not cause the armature disk to move permanently out of the shifted position. Because at least the attraction force acting on the armature disk, at the pole faces of the magnetically interacting component, which attraction force is generated by the permanent magnets, decreases continuously as the distance increases, there is a neutral position between the attracted position and the separated position in which the attraction force acting on the interacting component and the opposing force of clutch elements cancel one another out and which divides the actuating path into two component sections. In this context, in the stage that includes the attracted position, the mechanical attraction of the armature disk to the interacting component exceeds the opposing force of the clutch elements provided for this purpose at every position. In contrast, the magnetic attraction to the component is exceeded by the opposing force of clutch elements at every point on the component section in which the separated position is located. In the clutch according to the invention, the clutch elements are preferably matched to the permanent magnets in such a way that approximately the same amount of energy has to be applied in both axial directions in order to displace the armature disk, so as to move it out of the respectively set state.

Owing to the stability of the defined positions of the armature disk, the solenoid is, in particular, operated with an increased strength of current only for the duration of the change of position of the armature disk, in order either to overcome the attraction force of the permanent magnets or the opposing force of clutch elements. As a result, the clutch provides the significant advantage that it only requires little energy, or even no energy at all, for the period in which it is in the engaged or disengaged state. As a result of the short period of the loading of current, the solenoid is subjected to lower continuous thermal loading.

Because of the continuous and monotonous dependence of the attraction force, generated by a permanent magnet, on the distance from the armature disk, the clutch elements can be matched using three variables. These variables are the remanence flux density of the permanent magnets, the length of the actuating path and the strength of clutch elements which generate the force counter to the attraction of the armature disk to the magnetically interacting component. The clutch can be adapted to various strengths of the permanently magnetic remanence by virtue of the fact that the actuating path of the armature disk is correspondingly changed or by adapting the force of the clutch elements which act counter to the permanent magnets. Likewise, given a predefined strength of the permanent magnets, the opposing force generated by clutch elements can be adapted in such a way that the armature disk moves over a correspondingly shorter or longer actuating path. This clutch therefore provides the advantage that it permits various approaches to adapting its dimensions to predefined conditions of use.

The clutch elements are preferably matched to one another in such a way that a distance between the armature disk and the component which interacts magnetically with the armature disk is maintained if the flow of current in the electric coil, whose magnetic shifting force brings about the separation of the armature disk and the component, is completely switched off. The electric coil is connected to current only for a period which is necessary for engagement or disengagement. The period in which the clutch remains in its respective state until the next shifting operation is, however, significantly longer than the shifting period. This embodiment according to the invention therefore provides the advantages that the clutch does not consume any electric current and therefore no energy over the relatively long time periods of a set clutch state and during this time does not generate any electrical resistance heat within the clutch either.

One preferred embodiment of the invention provides that the component with which the armature disk magnetically interacts is the rotor. This clutch element is usually used to drive the clutch.

A further preferred embodiment of the invention consists in the fact that the magnetically interacting component is an element which is connected to the output side in a rotationally fixed fashion. For example, the component may be a friction disk which is connected to the output shaft in a rotationally fixed fashion. The component which is connected to the output side is, for example, equipped with permanent magnets in such a way that they fix the armature disk to the pole faces of the component, if appropriate counter to the force which is exerted by other clutch elements. The component and the armature disk may form one unit.

It is particularly preferred that in terms of its power the configuration of the coil is matched to the strength of current necessary to separate the armature disk in such a way that this strength of current is above the strength of current which is permissible for continuous operation of the solenoid. The forces acting on the armature disk are matched for defined positions so that they can be permanently maintained without significant support by the electromagnet. For this reason, the solenoid is loaded mainly by the currents with which the position of the armature disk is changed. An, if appropriate, short actuating path between the two stable positions of the armature disk and the magnetic attraction force acting on the armature disk, which force increases in a strongly non-linear fashion when the poles are brought together, has the advantage that the change in position of the armature disk can take place in a very short time, for example fractions of a second. In contrast, the dwell time of the clutch in the engaged or disengaged state is very long compared to the shifting period. For this reason, the solenoid can be briefly overloaded with an increased strength of current. The length of the current pulse is limited to the duration of the change in position. The heat which is introduced into the clutch electrically is output into the surroundings to a large extent or completely, while the clutch remains in the engaged or disengaged state. This provides the advantage that the clutch can be constructed with a relatively small solenoid, and can therefore be made more compact.

Furthermore it is proposed that, in particular in conjunction with a control unit, the magnetic resistances which magnetically bound from one another the pole face regions of the component which interacts magnetically with the armature disk are embodied in such a way that the magnetic attraction force of the component which is generated by the permanent magnet is limited to the armature disk, when the latter is situated in a stable position removed from the component, in such a way that the armature disk can be attracted from the stable position separated from the component to the pole face of the component only by means of the solenoid. Such magnetic resistances are mainly used to direct the largest possible part of the magnetic flux to act on the armature disk. In particular, the arcuate slits with which pole face regions on the rotor are magnetically separated from one another are an example of such magnetic resistances on an interacting component. For this reason, the clutch can be matched to form stable shifted positions not only through force-exerting clutch elements. This matching is advantageously also brought about by the dimensioning of magnetic resistances in the interacting component, the adaptation of which is less costly compared to permanent magnets and force-generating elements.

Furthermore it is proposed that the invention be embodied in particular with a control unit such that the flow of electrical current in the solenoid is adapted during operation of the clutch. As a result, it is possible, on the one hand, to compensate for a reduction in the remanence induction of the permanent magnets. On the other hand, the solenoid with a weak permanent current can improve the operational reliability of the stable states.

BRIEF DESCRIPTION OF THE DRAWING

For a fuller understanding of the nature and objects of the invention, reference should be made to the following detailed description of a preferred mode of practicing the invention, read in connection with the accompanying drawing which shows a detail of a first embodiment of the electromagnetic friction clutch in a perspective sectional view.

DETAILED DESCRIPTION OF THE INVENTION

The electromagnetic friction disk clutch 1 illustrated corresponds to the embodiment of the invention in which the armature disk 3 interacts with a rotor 2a, 2b not only magnetically but also in terms of a friction mechanism. The armature disk 3 is divided by arcuate slits 13 into two concentric pole face regions which are connected to one another by webs between the arcuate slits 13. Similarly, the pole face of rotor 2a, 2b is divided into three pole face regions by two concentric rows of arcuate slits 12a, 12b at two different radial distances from the rotational axis of the rotor. The pole face regions of the armature and of the rotor are offset with respect to one another in the radial direction, as are the rows of arcuate slits 12a, 12b on the pole faces of the rotor and arcuate slits 13 on armature disk 3. As a result, the greater part of the magnetic flux is forced to move away from the magnetic resistances formed by the arcuate slits and to change to and fro in the radial direction between the rotor and the armature disk.

On the side of the rotor facing away from the armature side, two coaxial cylindrical walls extend in the axial direction. There, the two coaxial cylindrical walls take up the magnetic flux which is generated by the permanent magnet 9, via magnetically conductive clutch elements 11 and 10, and together with the latter enclose electromagnet 8, such as a switchable electric coil or a solenoid. The permanent magnet 9 is a circular disk ring made of hard-magnetic material. The magnetically conductive clutch element 11, which has a T cross section and surrounds the rotational axis S in a circular shape, takes up, on one of its pole faces, the magnetic flux generated by the permanent magnet 9, and directs it on to the rotor. The magnetically conductive clutch element 10, which has an L cross section, runs in a circular shape around the rotational axis S and takes up the magnetic flux of the permanent magnet from the opposed pole side thereof. The electromagnet 8, the permanent magnet 9 and magnetically conductive clutch elements 10 and 11 are permanently connected to the assembly which is to be driven. The cylindrical walls of the rotor cover large parts of the cylindrical faces of magnetically conductive clutch elements 10 and 11, from which they are separated only by very narrow air gaps. As a result, the magnetic circuit of both the permanent magnet 9 and of the electromagnet 8 is closed via the rotor. When the pole faces of the armature disk and of the rotor rest one against each other, the magnetic resistance is reduced further and the magnetic flux, which is generated by the permanent magnet 9, is sufficient to attract the armature disk 3 continuously.

The force of the magnetic flux, which is directed to the pole faces of the rotor by the permanent magnet, is, however, not sufficient to attract the armature disk out of its separated position to the pole faces of the rotor. The armature disk 3 is connected to the output shaft 7 via a spring connecting element 4, such as an armature spring, and the clutch elements 5 and 6, which are, for example, a flange and a sleeve, respectively. In this context, the restoring force of the spring element 4 is initially very much larger, in the case of small deflections out of the position of rest (separated position), than the attraction force to the pole faces of the rotor which is generated by the permanent magnet 9. In this position, the armature disk is separated from the rotor, for example, by equilibrium distance r, where the attraction force resulting from the permanent magnet 9 and the restoring force of the spring element 4 cancel one another out, which is present, between the pole faces of the armature disk and of the rotor. Because part of the magnetic flux which is generated by the permanent magnet 9 is short-circuited in the rotor via the webs and pole face slits, the boundaries of the pole face regions of the rotor reduce the attraction force to the armature disk. For this reason, the boundaries of the pole face regions provide an important feature in this arrangement for matching the attraction force of the permanent magnet and the restoring force of the spring element 4 to one another in such a way that the armature disk can assume two stable positions.

The coil winding of the electromagnet 8 likewise forms a circular ring around the rotational axis S. When a current of a suitable strength and polarity flows through the coil winding, the attraction force generated by the coil windings of electromagnet 8 supports the attraction force of the permanent magnet 9 in such a way that the opposing force applied by the sprung connecting element 4 is overcome and the armature disk 3 is attracted. Because the attraction force increases very greatly as the distance between the pole faces of the rotor 2a, 2b and the armature disk 3 decreases, a short current pulse in electromagnet 8 is already sufficient to place the armature disk 3 in the attracted state.

Owing to the non-linear dependence of the attraction force on the distance r, a relatively high current with reversed polarity must flow through electromagnet 8 in order to separate the armature disk 3. However, even then only a short current pulse is required because the magnetic attraction drops greatly as the distance r increases.

LIST OF REFERENCE SYMBOLS

1 Clutch
2a, 2b Rotor
3 Armature disk
4 Armature spring
5 Flange
6 Sleeve
7 Shaft
8 Solenoid
9 Permanent magnet
10 Magnetically conductive clutch element (L cross section)
11 Magnetically conductive clutch element (T cross section)
12a, 12b Arcuate slits (rotor)
13 Arcuate slits (armature)

We claim:
1. An electromagnetically operated friction disk clutch for a motor vehicle comprising: a rotor, an armature disk that is attracted against the rotor by means of magnetic forces, a switchable electric coil for applying a magnetic force to the armature disk, permanent magnets for applying an attraction force to the armature disk against the rotor so that the armature disk rests against the rotor, and clutch elements that are matched to one another in such a way that the armature disk remains in a position in which it is separated from and rotatable relative to the rotor when a switching force is applied to the armature disk by the switchable electric coil counter to the force of the permanent magnets, whereby the switching force separates the armature disk from the rotor, and subsequently the switching force of the switchable electric coil is removed, wherein the armature disk and the rotor are only brought into physical contact by application of the switching force of the switchable electric coil, wherein the permanent magnets are positioned between magnetically conductive clutch elements, where one magnetically conductive clutch element positioned between the permanent magnets and the rotor directs magnetic flux from one pole face of the permanent magnets to the rotor, and another magnetically conductive clutch element positioned opposite to a side of the permanent magnets facing away from the rotor directs magnetic flux from the other pole face of the permanent magnets to the rotor, and wherein the magnetically conductive clutch elements are permanently connected to a static part of assembly which is to be driven.

2. The electromagnetically operated friction disk clutch according to claim 1, wherein the clutch elements are matched to one another in such a way that a distance between the armature disk and the rotor is maintained when the flow of current in the switchable electric coil, whose magnetic shifting force brings about the separation of the armature disk and the rotor, is switched off.

3. The electromagnetically operated friction disk clutch according to claim 1, wherein the armature disk is connected to an output in a rotationally fixed fashion.

4. The electromagnetically operated friction disk clutch according to claim 1, wherein a power of the coil is matched to a strength of current necessary to separate the armature disk and the rotor, and the strength of current is above the strength of current permissible for continuous operation of the switchable electric coil.

5. The electromagnetically operated friction disk clutch according to claim 1, further comprising a control unit, wherein magnetic resistances which delimit pole face regions of the rotor and the armature disk are realized in such a way that the magnetic attraction force of the rotor which is generated by the permanent magnets and which is acting on the armature disk is being limited in such a way that only with support of the electromagnetic coil the armature disk can be pulled away from the stable position remote from the rotor pulling the armature disk to the pole faces of the rotor.

6. The electromagnetically operated friction disk clutch according to claim 1, wherein the clutch elements are matched to one another in such a way that a stable distance between the armature disk and the rotor is overcome only by the additional attraction force of the switchable electric coil.

7. The electromagnetically operated friction disk clutch according to claim 1, further comprising a control unit, wherein the control unit adapts the flow of electric current in the switchable electric coil during operation of the clutch.

\* \* \* \* \*